(12) United States Patent
Choe et al.

(10) Patent No.: US 7,287,921 B2
(45) Date of Patent: Oct. 30, 2007

(54) KEY ARRAY OF KEYBOARD

(75) Inventors: Gwang-Woo Choe, Suwon-si (KR); Kyung-Ho Oh, Gumi-si (KR); Heui-Jin Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/125,117

(22) Filed: May 10, 2005

(65) Prior Publication Data

US 2005/0281604 A1 Dec. 22, 2005

(30) Foreign Application Priority Data

Jun. 19, 2004 (KR) .................. 10-2004-0045889

(51) Int. Cl.
*B41J 5/00* (2006.01)

(52) U.S. Cl. .............. 400/477; 400/489; 400/485; 400/484; 400/486; 361/680 B

(58) Field of Classification Search ............ 400/477, 400/489, 485, 486, 484; 341/22, 25; 361/680
See application file for complete search history.

(56) References Cited

U.S. PATENT DOCUMENTS

| | | | | |
|---|---|---|---|---|
| 5,661,505 A | * | 8/1997 | Livits | 345/169 |
| 5,790,103 A | * | 8/1998 | Willner | 345/168 |
| 5,818,437 A | * | 10/1998 | Grover et al. | 715/811 |
| 5,861,821 A | * | 1/1999 | Kato et al. | 341/22 |
| 6,231,252 B1 | * | 5/2001 | Kitamura | 400/484 |
| 6,286,064 B1 | * | 9/2001 | King et al. | 710/67 |
| 6,348,878 B1 | * | 2/2002 | Tsubai | 341/23 |

* cited by examiner

*Primary Examiner*—Ren Yan
*Assistant Examiner*—Matthew Marini
(74) *Attorney, Agent, or Firm*—Roylance, Abrams, Berdo & Goodman, L.L.P.

(57) ABSTRACT

A key array for a keyboard is provided having an input key section including a plurality of input keys. Each input key has a left key part, a central key part, and a right key part. A left control key is positioned on a left side of the input key section so as to convert a mode of the keyboard into a right key input mode so that the right key part is operated when a user presses the key input section. A right control key is positioned on a right side of the input key section so as to convert the mode of the keyboard into a left key input mode so that the left key part is operated when the user presses the key input section. A shift key section including two shift keys is aligned on both sides of the keyboard adjacent to the left and right control keys in order to attain additional functions of the keyboard when the shift keys are pressed simultaneously with the input key section.

11 Claims, 3 Drawing Sheets

KEY ARRAY OF KEYBOARD

PRIORITY

This application claims the benefit under 35 U.S.C. 119(a) of Korean Patent Application Serial No. 2004-45889, filed on Jun. 19, 2004, entitled "Key Array of Keyboard," the entire disclosure of which is hereby incorporated by reference.

BACKGROUND OF THE INVENTION

1. Field of the Invention

The present invention relates to user interfaces for information/computing devices. More particularly, the present invention relates to a key array of a keyboard which allows a user to conveniently and effectively use the keyboard.

2. Description of the Related Art

Recently, attempts have been made to minimize and simplify the structures of information/computing devices. Consequently, the portability of information/computing devices is becoming a main factor which consumers utilize for determining the value of such devices. Accordingly, various attempts have been made in order to provide the information/computing devices with increased functional capabilities while reducing the size of the device. However, such attempts inevitably inconvenience users in some way. In particular, users often feel inconvenienced when having to use a relatively small keyboard.

In general, a full size keyboard includes 26 keys which correspond to the 26 letter alphabet, 10 numerical keys, and various special and functional keys. A WINDOWS/IBM PC-flexible 101/103 keyboard is used as a standard keyboard. In addition, the keyboard is mainly equipped with a QWERTY key array. A conventional PC keyboard equipped with the QWERTY key array is shown in FIG. 1.

Hand-held device keyboards are being provided to improve the portability of the device. The hand-held device keyboard is generally formed without special and/or functional keys, since special or functional keys are rarely used in the full size keyboard. Thus, the size of the hand-held device keyboard may be reduced in size when compared to the full size keyboard. Despite these efforts, users still may feel inconvenienced when using smaller hand-held device keyboards. The hand-held device keyboard is mainly used in information/computing devices, such as notebook PCs and PDAs, in which "portability" is an important factor.

In addition, keypads are also being used which assign several characters to each key. Thus, the number of keys and the size of the keyboard is minimized. The keypad is adaptable for appliances having small sizes, such as mobile phones. Since the keypad operates based on a numeral key input scheme, when fabricating the keypad, it is necessary to take an array of the numerical keys into consideration.

Since the conventional full size keyboard used in the PC includes a greater number of keys, such as the 26 alphabet keys, 10 numerical keys and various functional keys, the conventional full size keyboard is often provided with a greater space to install the above keys. In addition, although the hand-held device keyboard and the keypad may be fabricated having a minimized size, they are provided with smaller-sized keys. Consequently, users may feel inconvenienced or key-input errors may occur more frequently when operating the keys.

Accordingly, there is a need for keyboard having a key array capable of allowing users to effectively use various functions of the keyboard within a limited space.

SUMMARY OF THE INVENTION

An aspect of the present invention is to solve at least the above problems and/or disadvantages and to provide at least the advantages described below. Accordingly, an aspect of the present invention is to provide a key array of a keyboard capable of allowing users to effectively use various functions of the keyboard within a limited space.

Another object of the present invention is to provide an effective user interface for information/computing devices, such as small-sized information appliances which require superior portability and effective space utilization.

In order to accomplish these objects, according to one aspect of the present invention, there is provided a key array of a keyboard comprising an input key section including a plurality of input keys each having a left key part, a central key part, and a right key part. A left control key is positioned on a left side of the input key section so as to convert a mode of the keyboard into a right key input mode so that the right key part is operated when a user presses the key input section. A right control key is positioned on a right side of the input key section so as to convert the mode of the keyboard into a left key input mode so that the left key part is operated when the user presses the key input section. A shift key section including two shift keys is aligned on both sides of the keyboard adjacent to the left and right control keys in order to utilize additional functions of the keyboard when the shift keys are pressed simultaneously with the input key section.

According to another aspect of the present invention, there is provided a key array of a keyboard comprising an input key section including a first key row comprising [Q/+/Y], [W/1/U], [E/2/I], [R/3/O] and [T/←/P] keys, a second key row comprising [A/–/H], [S/4/J], [D/5/K], [F/6/L] and [G/Enter/;] keys, a third key row comprising [Z/=/N], [X/7/M], [C/8/,], [V/9/.] and [B/space//] keys, and a fourth key row comprising [$/*/!], [@/0/?] and keys. A left control key is positioned on a left side of the input key section so as to convert a mode of the keyboard into a right key input mode so that a right key part of the key input section is operated when a user presses the key input section. A right control key is positioned on a right side of the input key section so as to convert the mode of the keyboard into a left key input mode so that a left key part is operated when the user presses the key input section. A shift key section including two shift keys is aligned on both sides of the keyboard adjacent to the left and right control keys in order to utilize additional functions of the keyboard when the shift keys are pressed simultaneously with the input key section.

According to still another aspect of the present invention, there is provided a key array of a keyboard comprising an input key section including a central key part having a first key row having [+], [1], [2], [3] and [←] keys, a second key row having [–], [4], [5], [6] and [Enter] keys, a third key row having [=], [7], [8], [9] and [Space] keys, and a fourth key row having [*], [0] and [#] keys which are operated in a normal state of the keyboard. A left key part has a first key row with [Q], [W], [E], [R] and [T] keys, a second key row of [A], [S], [D], [F] and [G] keys, a third key row of [Z], [X], [C], [V] and [B] keys, and a fourth key row of [$], [@] and [[] keys. These keys are operated in a left key input mode of the keyboard. A right key part is provided having a first row of [Y], [U], [I], [O] and [P] keys, a second row of [H], [J], [K], [L] and [;] keys, a third row of [N], [M], [,], [.] and [/] keys, and a fourth row of [!], [?] and []] keys. These keys are operated in a right key mode of the keyboard. A left control key is positioned on a left side of the input key section so as to convert a mode of the keyboard into the right key input mode so that the right key part is operated when a user presses the key input section. A right control key is positioned on a right side of the input key section so as to convert the mode of the keyboard into the left key input mode so that the left key part is operated when the user presses the key input section.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for conciseness.

Figure 1:
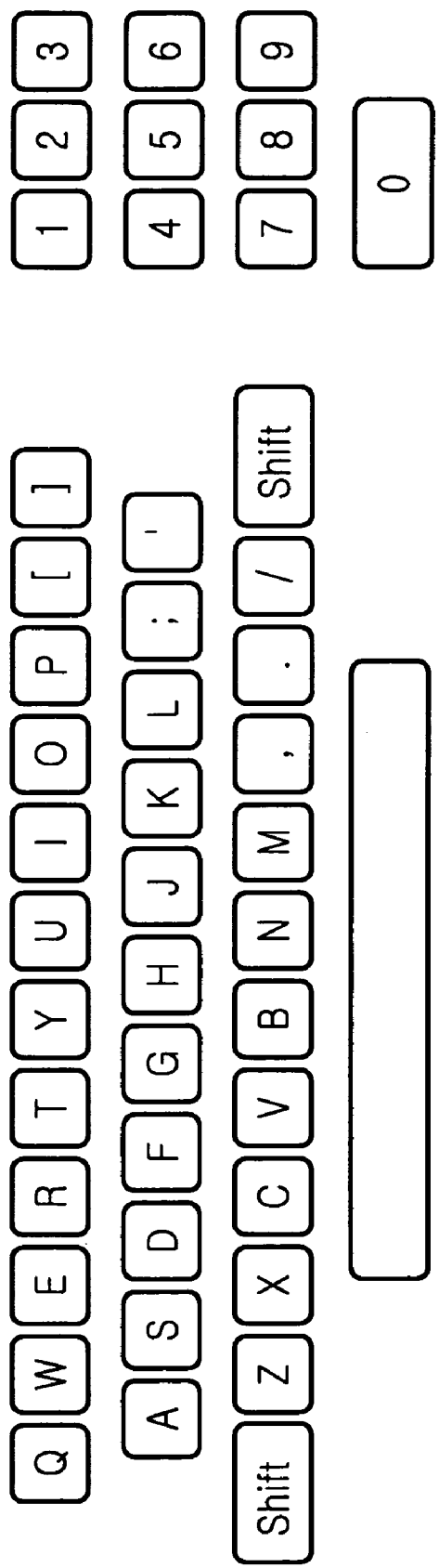
FIG. 1 is a view illustrating a key array of a conventional keyboard.
Figure 2:
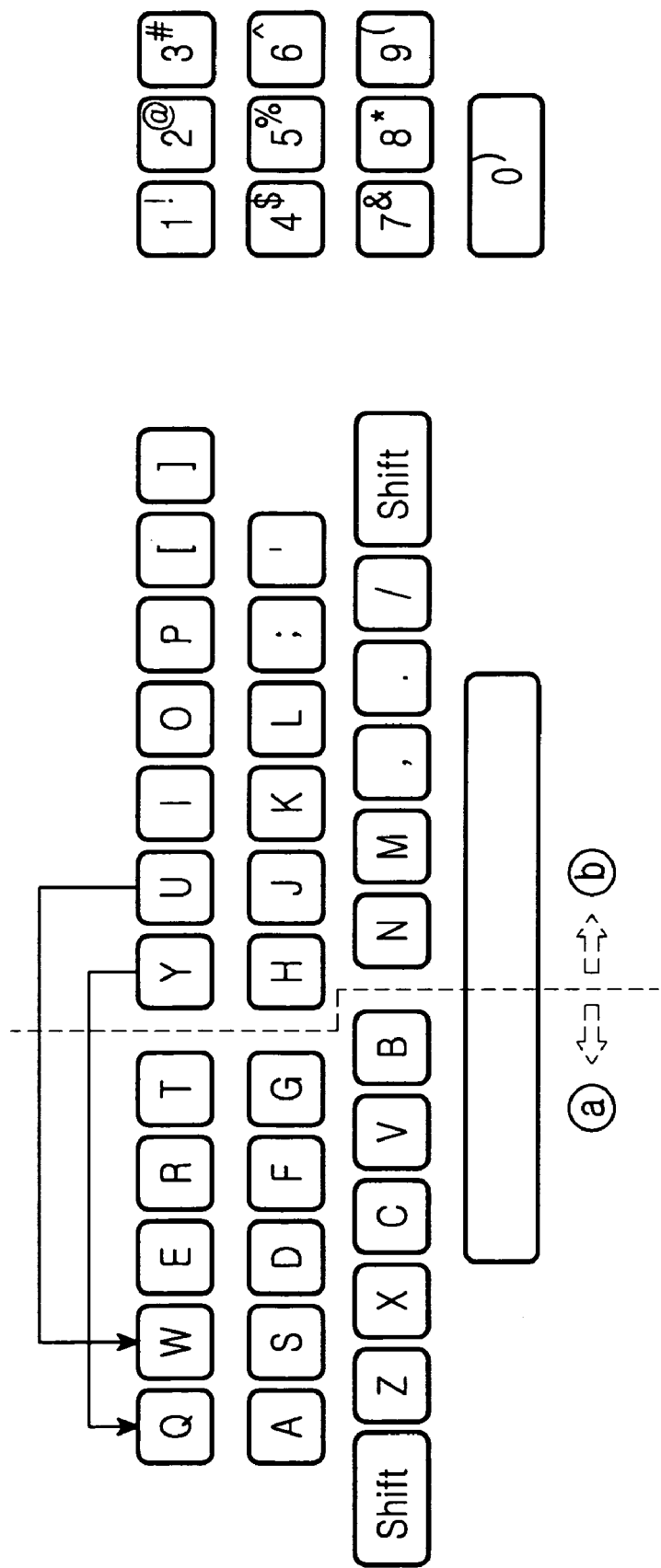
FIG. 2 is a view for explaining left and right keyboard sections of a conventional keyboard.
Figure 3:
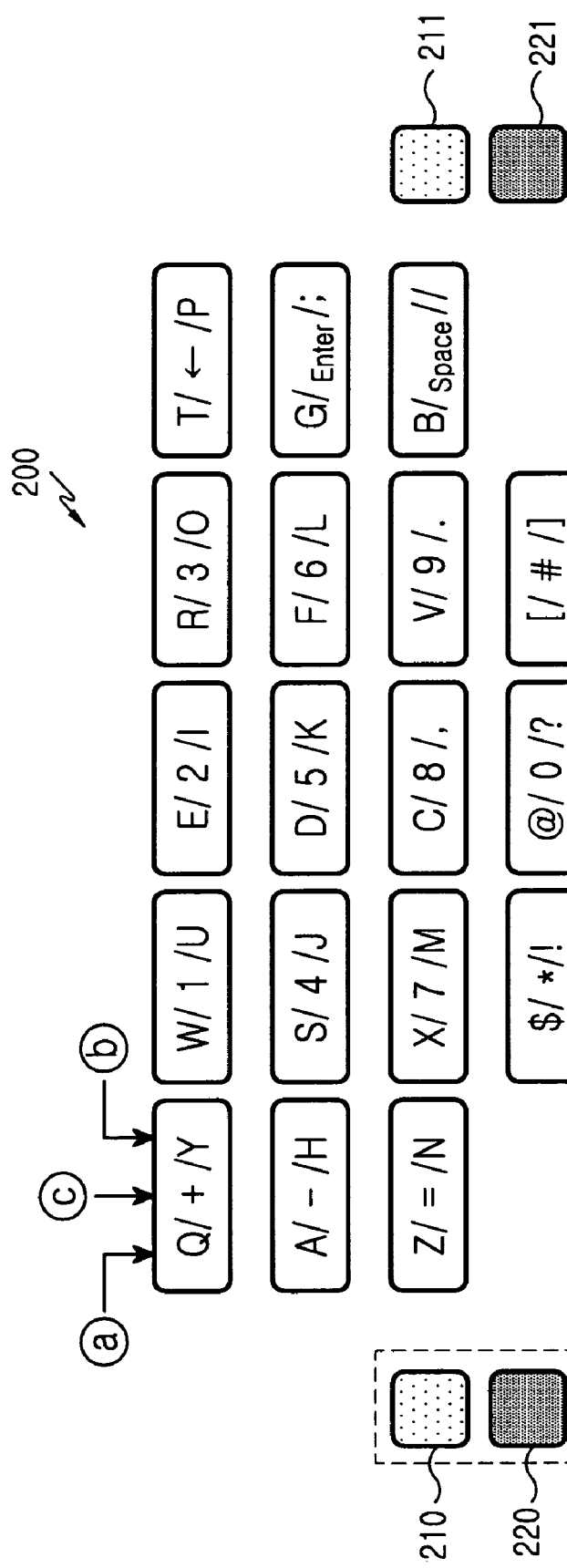
FIG. 3 is a view illustrating a key array of a keyboard in accordance with an embodiment of the present invention.

FIG. 2 is an exemplary view illustrating left and right keyboard sections of a conventional keyboard. FIG. 3 is an exemplary view illustrating a key array of a keyboard in accordance with an embodiment of the present invention.

In general, as shown in FIG. 2, the keyboard is divided into a left keyboard section (a) and a right keyboard section (b) corresponding to the left and right hands of a user.

The exemplary embodiment of the present invention relates to the key array of the keyboard which is familiar to users. Hereinafter, the exemplary embodiment of the present invention will be described with reference to FIG. 3.

Referring to FIG. 3, the keyboard includes an input key section 200, a left control key 220, a right control key 221, and a shift key section.

The input key section 200 includes eighteen input keys and each of the eighteen input keys comprising a left key part (a), a central key part (c) and a right key part (b).

The left key parts (a) comprise character keys and special character keys. The left key parts (a) are preferably pressed by a left hand of a user. The right key parts (b) comprise character keys and special character keys, which are preferably pressed by a right hand of the user. In addition, the central key parts (c) comprise numerical keys, special character keys and functional keys, which are preferably pressed by the right hand of the user. In a normal state of the keyboard, the central key parts (c) may operate when the user presses input keys of the input key section 200.

In addition, the left control key 220 is positioned on a left side of the input key section 200. If the user presses the left control key 220, the keyboard is converted into a right key input mode so that the right key parts (b) may operate when the user presses input keys of the input key section 200. In the right key input mode, the user presses the input keys of the input key section 200 by preferably using the right hand while simultaneously pressing the left control key 220 with the left hand.

The right control key 221 is positioned on a right side of the input key section 200. If the user presses the right control key 221, the keyboard is converted into a left key input mode so that the left key parts (a) may operate when the user presses input keys of the input key section 200. In the left key input mode, the user presses the input keys of the input key section 200 by preferably using the left hand while simultaneously pressing the right control key 221 using the right hand.

In addition, the shift key section includes a left shift key 210 and a right shift key 211. The left shift key 210 is positioned on the left side of the input key section 200 adjacent to the left control key 220. The user presses the left shift key 210 simultaneously with the central keys (c) or simultaneously with the left control key 220 and the right key parts (b) when it is necessary to perform additional functions of the keyboard.

The right shift key 211 is positioned at the right side of the input key section 200 adjacent to the right control key 221. The user presses the right shift key 211 simultaneously with the central keys (c) or simultaneously with the right control key 221 and the left key parts (a) when it is necessary to perform additional functions of the keyboard.

The left and right shift keys 210 and 211 have functions similar to those of shift keys of a conventional keyboard. That is, when additional characters or additional functions are assigned to input keys, if the user presses the input keys simultaneously with the left shift key 210 or the right shift key 211, the additional characters are displayed or additional functions are performed. Accordingly, when the shift key is pressed simultaneously with one of input keys, various functions, such as capital letter/small letter conversion and page up/down functions, may be achieved.

For instance, when it is necessary to input "YOUNG 124" by using the key array of the keyboard as shown in FIG. 3, the user first presses the left control key 220 by preferably using the left hand. This is done while simultaneously pressing the key positioned on the first row-first column, the Q/+/Y key of the key array, by preferably using the right hand. Thus, "Y" is displayed in a display section. After that, in the right key input mode in which the left control key 220 is being pressed, the user sequentially presses keys positioned on the first row-fourth column (R/3/O), the first row-second column (W/1/U) and the third row-first column (Z/=/N) of the key array by preferably using the right hand, thereby displaying "O", "U" and "N" in the display section.

After that, the user converts the right key input mode into the left key input mode by pressing the right control key 221 by preferably using the right hand. In the left key input mode in which the right control key 221 is being pressed, the user presses a key positioned on the second row-fifth column of the key array by preferably using the left hand, thereby displaying "G" in the display section. Consequently, "YOUNG" is now displayed in the display section. After inputting "YOUNG", the user sequentially presses keys positioned on the first row-second column, the first row-third column, and the second row-second column of the key array without pressing the left and right control keys 220 and 221, so that "YOUNG 124" is displayed in the display section.

According to the key array of the keyboard of the exemplary embodiment of the present invention, keys aligned on the right keyboard section of the conventional keyboard, such as a QWERTY keyboard or other keyboards which are currently used, are overlapped with keys aligned in the left keyboard section of the conventional keyboard, without changing the position of the keys. Accordingly, the user may relatively easily become accustomed to using the keyboard with effective space utilization. In addition, the size of the keys may be enlarged by approximately two times the size of conventional keys or the size of the keyboard may be reduced by a approximately one-half.

As described above, the key array of the keyboard according to embodiments of the present invention may allow the users to easily use the keyboard with effective space utilization while minimizing the size of the keyboard used in the information/computing devices. In addition, it is possible to reduce a key-input error when operating the keys. Furthermore, since the size of the keys may be enlarged by approximately two times as compared with the size of the conventional keys, the user can conveniently input data by using the key array of the keyboard. In addition, the user may be relatively easily accustomed to use the keyboard while reducing inconvenience of the user caused by the smaller keyboard.

While the invention has been shown and described with reference to certain embodiments thereof, it will be understood by those skilled in the art that various changes in form and details may be made therein without departing from the spirit and scope of the invention as defined by the appended claims.

What is claimed is:

1. A key array of a keyboard comprising:
   an input key section including a plurality of input keys, each of the keys having a left key part, a central key part, and a right key part, each key part corresponding to a selected input mode;
   a left control key positioned on a left side of the input key section so as to convert a mode of the input key section of the keyboard into a right key part input mode such that the right key part input mode is actuated when a user presses the input key;
   a right control key positioned on a right side of the input key section so as to convert the mode of the input key section of the keyboard into a left key part input mode so that the left key part input mode is actuated when the user presses the input key; and
   a shift key section including two shift keys aligned on both sides of the keyboard adjacent to the left and right control keys in order to utilize additional functions of the keyboard when the shift keys are pressed simultaneously with an input key of the input key section.

2. The key array of the keyboard as claimed in claim 1, wherein the two shift keys of the shift key section comprise a left shift key aligned adjacent to the left control key so as to utilize additional functions of the keyboard when the left shift key is pressed simultaneously with an input key to input the central key part of the input key section or when the left shift key is pressed simultaneously with the left control key to input the right key part of the input key section, and a right shift key aligned adjacent to the right control key so as to utilize additional functions of the keyboard when the right shift key is pressed simultaneously with an input key to input the central key part of the input key or simultaneously with the right control key and an input key to input the left key part of the input key.

3. The key array of the keyboard as claimed in claim 1, wherein the input key section includes a first key row comprising [Q/+/Y], [W/1/U], [E/2/I], [R/3/O] and [T/←/P] keys, a second key row comprising [A/-/H], [S/4/J], [D/5/K], [F/6/L] and [G/Enter/; ] keys, a third key row comprising [Z/=/N], [X/7/M], [C/8/,], [V/9/.] and [B/Space//] keys, and a fourth key row comprising [$/*/!], [@/0/?] and keys.

4. A key array of a keyboard comprising:
   an input key section including a first key row comprising [Q/+/Y], [W/1/U], [E/2/I], [R/3/O] and [T/←/P]keys, a second key row comprising [A/-/H], [S/4/J], [D/5/K], [F/6/L] and [G/Enter/;] keys, a third key row comprising [Z/=/N], [X/7/M], [C/8/,], [V/9/.] and [B/Space//] keys, and a fourth key row comprising [$/*/!], [@/0/?] and keys;
   a left control key positioned on a left side of the input key section so as to convert a mode of the keyboard into a right key input mode so that a right key part mode of a key of the key input section is input when a user presses a key of the key input section;
   a right control key positioned on a right side of the input key section so as to convert the mode of the keyboard into a left key input mode so that a left key part mode is input when the user presses a key of the key input section; and
   a shift key section including two shift keys aligned at both sides of the keyboard adjacent to the left and right control keys in order to utilize additional functions of the keyboard when the shift keys are pressed simultaneously with a key of the input key section.

5. The key array of the keyboard as claimed in claim 4, wherein, in a normal state of the keyboard, [=], [1], [2], [3] and [←] keys of the first key row, [-], [4], [5], [6] and [Enter] keys of the second key row, [=], [7], [8], [9] and [Space] of the third key row, and [*], [0] and [#] keys of the fourth key row are operated.

6. The key array of the keyboard as claimed in claim 4, wherein, in the left key input mode of the keyboard, [Q], [W], [E], [R] and [T] keys of the first key row, [A], [S], [D], [F] and [G]keys of the second key row, [Z], [X], [C], [V] and [B] keys of the third key row, and [$], [@] and [[] keys of the fourth key row are operated.

7. The key array of the keyboard as claimed in claim 4, wherein, in the right key input mode of the keyboard, [Y], [U], [I], [O] and [P]keys of the first key row, [H], [J], [K], [L] and [;]keys of the second key row, [N], [M], [,], [.] and [/] keys of the third key row, and [!], [?] and []] keys of the fourth key row are operated.

8. The key array of the keyboard as claimed in claim 4, wherein the shift key section includes a left shift key aligned adjacent to the left control key so as to utilize additional functions of the input keys of the keyboard when the left shift key is pressed simultaneously with a key to input a central key part mode of a key of the input key section or when the left shift key is pressed simultaneously with the left control key and a key to input the right key part mode of the input key section, and a right shift key aligned adjacent to the right control key so as to utilize additional functions of the keyboard when the right shift key is pressed simultaneously with a key to input the central key part mode of the input key section or when the right shift key is pressed simultaneously with the right control key and a key to input the left key part mode of a key of the input key section.

9. The key array of the keyboard as claimed in claim 4, wherein the shift key section includes a left shift key aligned adjacent to the left control key so as to utilize additional functions of the keyboard when the left shift key is pressed in the normal state or the right key input mode of the keyboard, and the right shift key aligned adjacent to the right control key so as to utilize additional functions of the keyboard when the right shift key is pressed in the normal state or the left key input mode of the keyboard.

10. A key array of a keyboard comprising:
   an input key section including a plurality of input keys, each key having a central key part, a left keypart, and a right key part, each key part corresponding to a selected input mode, wherein the keys are arranged in rows where central key parts form a first key row of [+], [1], [2], [3] and [77 ] keys, a second key row of [−], [4], [5], [6] and [Enter] keys, a third key row of [=], [7], [8], [9] and [Space] keys, and a fourth key row of [*], [0] and [#] keys, which are operated in a normal state of the keyboard, the left key part parts form a first key row of [Q], [W], [E], [R] and [T] keys, a second key row of [A], [S], [D], [F] and [G] keys, a third key row of [Z], [X], [C], [V]and [B] keys, and a fourth key row of [$], [@] and [[] keys, which are operated in a left key input mode of the keyboard, and the right key parts form a first row of [Y], [U], [I], [O] and [P] keys, a second row of [H], [J], [K], [L] and [;] keys, a third row of [N], [M], [,], [.] and [/] keys, and a fourth row of [!], [?] and []] keys, which are operated in a right key mode of the keyboard;
   a left control key positioned on a left side of the input key section so as to convert a mode of the input keys of the keyboard into the right key input mode so that the right key part mode is input when a user presses a key of the key input section; and
   a right control key positioned on a right side of the input key section so as to convert the mode of the input keys of the keyboard into the left key input mode so that the left key part mode is input when the user presses a key of the key input section.

11. The key array of the keyboard as claimed in claim 10, further comprising
   a shift key section including two shift keys aligned on both sides of the keyboard adjacent to the left and right control keys in order to utilize additional functions of the keyboard when the shift keys are pressed simultaneously with a key of the input key section.

* * * * *